United States Patent [19]
Bell et al.

[11] 3,922,436
[45] Nov. 25, 1975

[54] SILANES USEFUL AS COUPLING AGENTS AND FLAME RETARDANTS

[75] Inventors: Reuben H. Bell, Cincinnati; Kevin M. Foley, Hebron, both of Ohio

[73] Assignee: Owens-Corning Fiberglas Corporation, Toledo, Ohio

[22] Filed: Sept. 13, 1974

[21] Appl. No.: 505,697

[52] U.S. Cl........... 428/375; 260/448.8 R; 427/299; 427/407
[51] Int. Cl.² ................... B32B 17/04; B32B 17/06
[58] Field of Search............ 117/126; 260/448.8 R; 161/193, 170, 208

[56] References Cited
UNITED STATES PATENTS

| | | | |
|---|---|---|---|
| 3,678,089 | 7/1972 | Berger | 260/448,8 R |
| 3,692,812 | 9/1972 | Berger | 260/448.8 R |
| 3,705,073 | 12/1972 | Marzocchi et al. | 161/193 |
| 3,853,692 | 12/1974 | Clayton et al. | 161/193 |
| 3,865,682 | 2/1975 | Marzocchi | 161/193 |
| 3,867,420 | 2/1975 | Morehouse et al. | 260/448.8 R |

*Primary Examiner*—William J. Van Balen
*Attorney, Agent, or Firm*—Carl G. Staelin; John W. Overman; Keith V. Rockey

[57] ABSTRACT

Organo silanes useful as coupling agents for glass fibers and as flame retardants, formed by reaction of an epoxy, a mercapto or an amino silane with a carboxylic acid or anhydride, or formed by a Diels-Alder reaction of a halogenated cyclo-pentadiene with an unsaturated silane.

34 Claims, No Drawings

SILANES USEFUL AS COUPLING AGENTS AND FLAME RETARDANTS

This invention relates to organo silicon compounds and more particularly to organo silanes for use as coupling agents and as flame retardants.

Glass fiber coupling or anchoring agents for use in the treatment of glass fibers have been known for a number of years. These coupling agents are usually organo silicon compounds which contain at least one organic group attached directly to the silicon atom, which is most frequently substituted with a reactive functional group (i.e., an amino group, a mercapto group, a hydroxy group, an epoxy group, etc.). The remaining valences of the silicon atom are usually taken up by hydrolyzable groups, most frequently hydrolyzable groups.

Compounds which have achieved widespread acceptance in the art include:

$H_2N-CH_2-CH_2-CH_2-Si(OC_2H_5)_3$
Gamma-aminopropyltriethoxy silane
$HS-CH_2-CH_2-CH_2-Si(OCH_3)_3$
Gamma-mercaptopropyltriethoxy silane

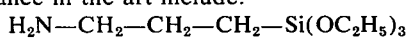

Gamma-glycidoxypropyltriethoxy silane

It is generally believed that, in the treatment of glass fibers with such organo silicon compounds, the hydrolyzable groups react with the surfaces of the glass fibers

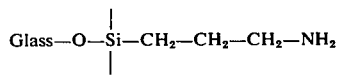

to leave the functional group available for reaction with a thermosetting resin when the treated glass fibers are used for reinforcement for such resins, or for reaction with an elastomeric material when the treated glass fibers are used as reinforcement for elastomeric materials in the manufacture of glass fiber-reinforced elastomeric products.

While the coupling agents employed to date are quite effective in promoting a strong bonding relationship between glass fibers and such resins or elastomeric materials, research has continued to find coupling agents which contain more reactive functional groups and which are susceptible to a wider variety of uses.

One of the primary difficulties with many of the coupling agents which are in use today is that they hydrolyze quite rapidly in aqueous medium to form the corresponding silanols and siloxanes. As a result, such silanes are difficult to employ in treating compositions embodying an emulsion, such as, for example, an emulsion of a film-forming material because the hydrolysis of the silane in the emulsion tends to cause coagulation of the film-forming material, particularly where the film-forming material is an elastomeric material.

It is accordingly an object of the present invention to provide certain new organo silanes which can be used as coupling agents for treatment of glass fibers to promote a secure bonding relationship between glass fibers and resinous plastics and elastomeric materials in the manufacture of glass fiber reinforced plastic and elastomeric products.

It is a more specific object of the invention to provide organo silanes containing an organic group substituted by a functional group which is highly reactive with thermosetting plastics and elastomeric materials for use as coupling agents for such plastics and elastomeric materials with glass fibers.

It is another object of the present invention to provide new organo silanes having high reactive organic groups and having improved stability in aqueous media.

It is a further object of the invention to provide glass fibers treated with organo silicon compounds for use as reinforment for plastics and elastomers in the manufacture of glass fiber reinforced plastic and elastomeric products.

The concepts of one embodiment of the invention reside in highly reactive organo silicon compounds which are formed by reaction of the anhydride of a dicarboxylic acid and an epoxy silane or a mercapto silane. These compounds, in the form of the silanes, have the following formulae:

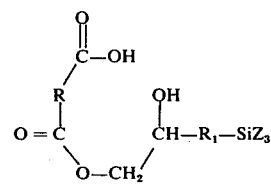

wherein R is the residue of the anhydride, $R_1$ is a divalent organic group and Z is a readily hydrolyzable group, and

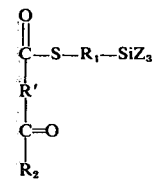

where $R_1$ and Z are as described above, R' is the residue of the anhydride and $R_2$ is hydrogen or $C_1$ to $C_3$ alkoxy.

R forming the residue of the anhydride is preferably an organic group containing 2 to 10 carbon atoms. Preferred R groups include $C_2$ to $C_6$ alkylene (i.e., dimethylene, trimethylene, etc.); $C_2$ to $C_6$ alkenyl (i.e., ethenyl, propenyl, etc.); as well as 5-norbornenylene. Suitable anhydrides and the R groups corresponding thereto include the following:

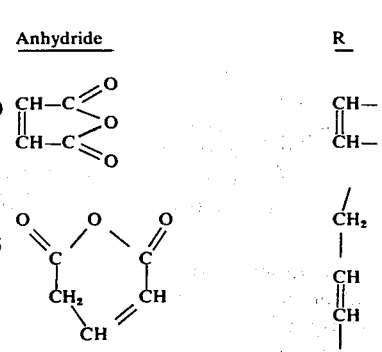

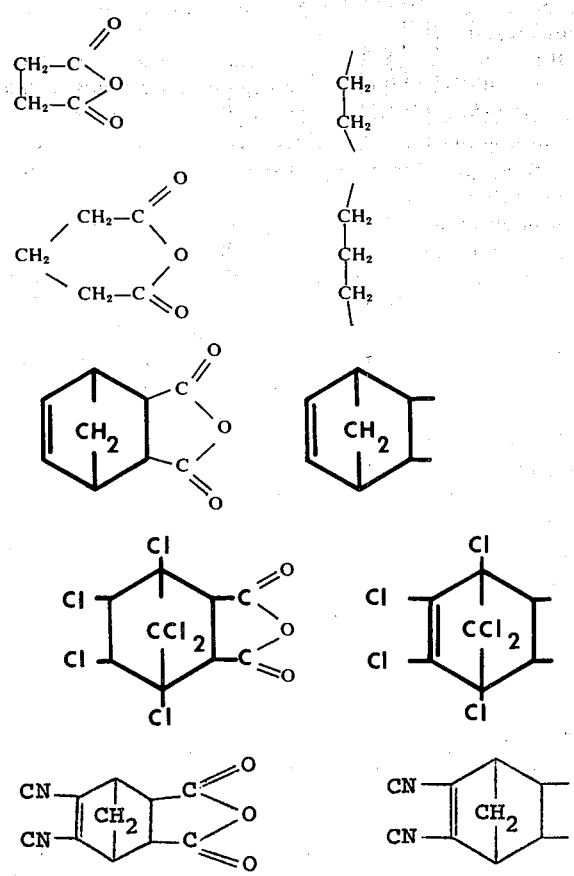

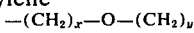

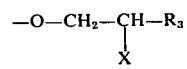

The 5-nornornenyl groups which may be present in the organo silicon compounds of this invention have the formula

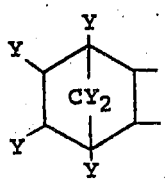

wherein Y is hydrogen, halogen, cyano, nitro as well as numerous other electron acceptor substituents. Representative of the corresponding anhydrides include 5-norbornene-2,3-dicarboxylic anhydride, 1,4,5,6,7,7-hexachloro-5-norbornene-2,3-dicarboxylic anhydride, 6-nitro-5-norbornene-2,3-dicarboxylic anhydride, etc.

R' also contains 2 to 10 carbon atoms, including $C_2$ to $C_6$ alkylene and 5-norbornleylene.

The $R_1$ group is derived from the organo silane employed as the starting material. $R_1$ can be alkyleneoxyalkylene $$-(CH_2)_x-O-(CH_2)_y$$

where x is preferably an integer from 1 to 3, usually 3, and y is an integer from 2 to 6; alkylene containing 2 to 6 carbons as well as other divalent organic groups.

Z is a readily hydrolyzable group, and preferably $C_1$ to $C_4$ alkoxy (i.e., methoxy, ethoxy, propoxy, etc.) or hologen (i.e., chlorine or bromine).

Z can also be a beta-haloalkoxy group $$-O-CH_2-\underset{X}{CH}-R_3$$

wherein $R_3$ is hydrogen or $C_1$ to $C_3$ alkyl (i.e., methyl, ethyl, etc.). The compounds where Z is a beta-haloalkoxy group as described are unique in that the compounds are much more resistant to hydrolysis in aqueous media as compared to compounds where Z is halogen or alkoxy. Without limiting the invention as to theory, it is believed that the presence of the halogen atom in the beta-position stabilizes the alkoxy group to significantly reduce the ratio of hydrolysis.

The organo silanes described above can be prepared by reacting the epoxy or mercapto silane in accordance with the following:

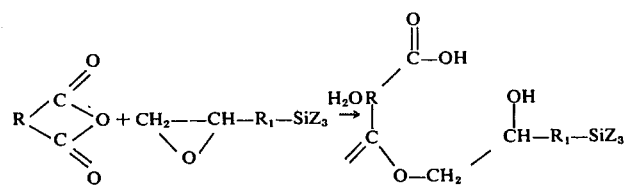

and

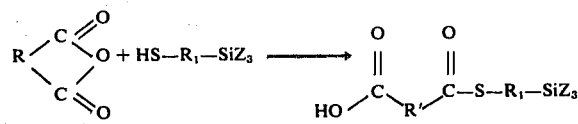

As will be appreciated by those skilled in the art, the corresponding ester derivatives of the mercapto adduct can be prepared by simply reacting the mercapto silane with the desired monoester of the dicarboxylic acid. Alternatively, the ester can be prepared by first forming the adduct between the mercapto silane and the anhydride as illustrated in the above formula and then reacting the adduct containing the free acid group with an alcohol to form the desired ester.

The reaction is preferably carried out at elevated temperatures with the silane as the reaction medium, although inert organic solvents may be used if desired. In carrying out the reaction of the epoxy silane with the anhydride, it is preferable to carry out the reaction in the process of 1 molar equivalent of water to form the free acid.

The silanes where Z is a beta-haloalkoxy group can be prepared in accordance with the techniques described in copending application Ser. No. 278,904, filed Aug. 9, 1972, the disclosure of which is incorporated herein by reference.
Representative compounds which can be prepared in accordance with the invention include the following:
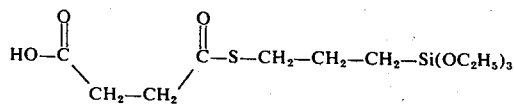
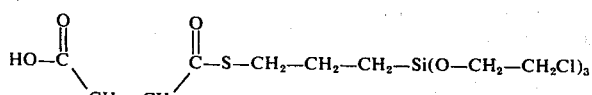
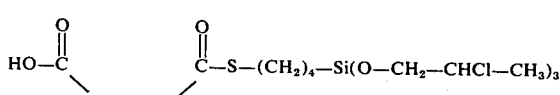
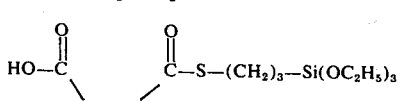
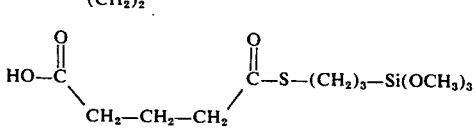
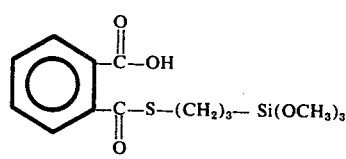
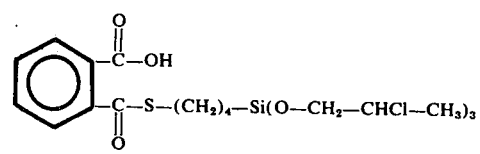
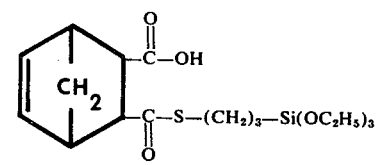
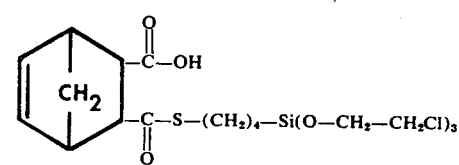
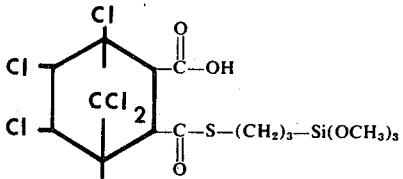
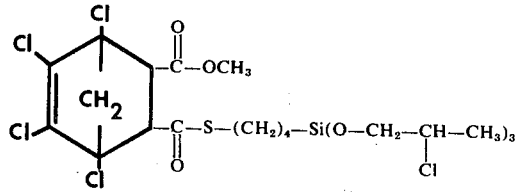
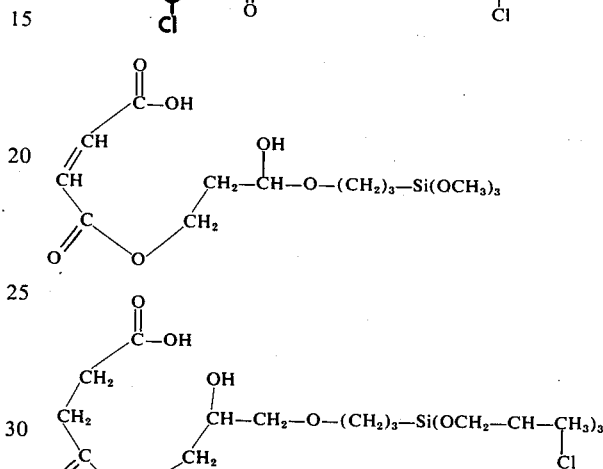
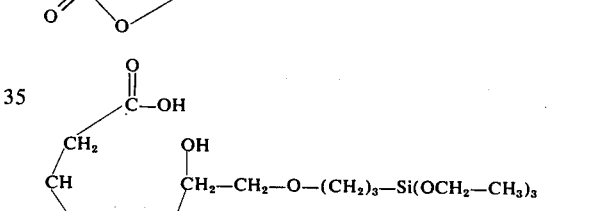
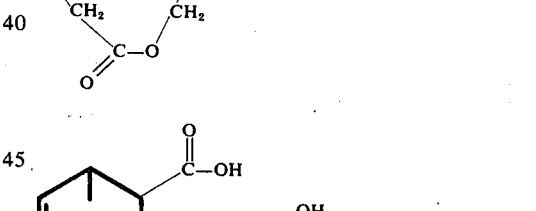
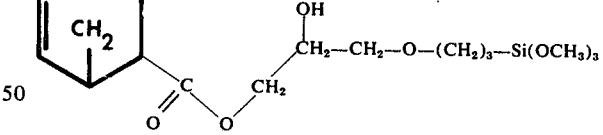
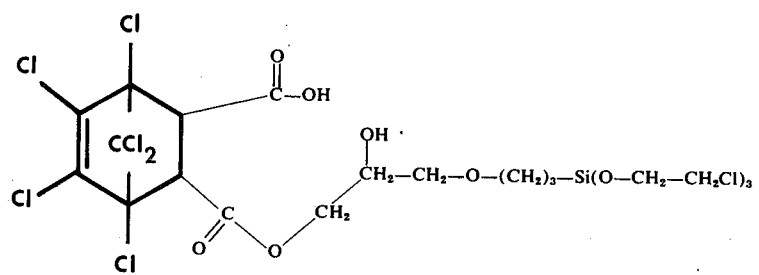
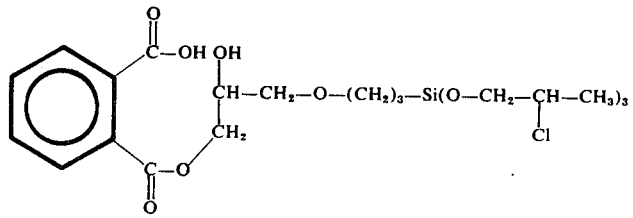

It has been found, in accordance with one variation on the invention, that the use of a monoester leads to a completely different type of product when reacted with an epoxy silane as described. For example, the anhydride is reacted first with an alkanol $R_2OH$ to form the monoester

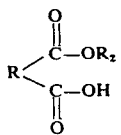

which is then reacted with the epoxide to form a compound of the formula

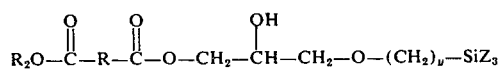

Examples of such compounds include:

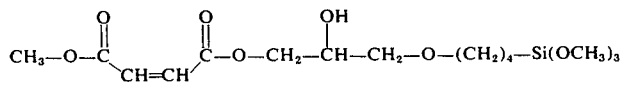

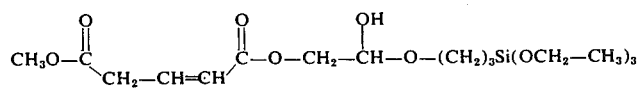

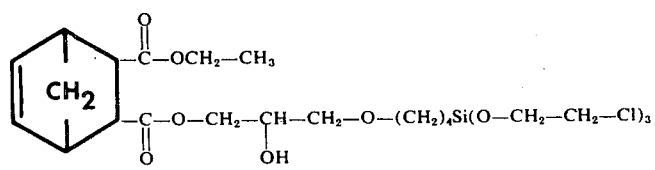

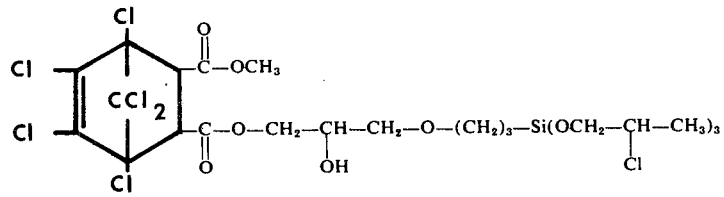

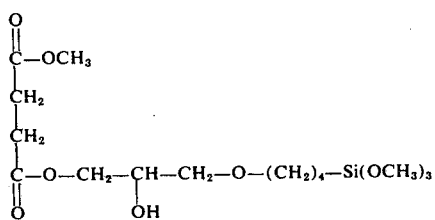

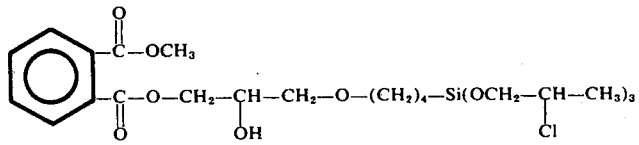

Another concept of the invention resides in novel amides having the general formula

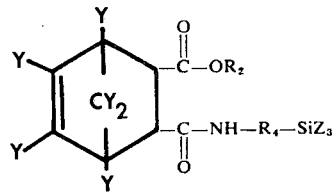

wherein Y, $R_2$ and Z are as described above and $R_4$ is an alkylene group containing 3 to 6 carbon atoms (e.g., trimethylene, tetramethylene, etc.).

These compounds can be prepared in a simple and efficient manner by simply reacting the corresponding amino silane with the corresponding anhydride (or monoalkyl ester when the ester product is desired), using reaction conditions typically employed for forming amides as described in U.S. Pat. No. 3,249,461. In general, it is desirable to avoid reaction temperatures in excess of about 100°C because the product tends to rearrange to form the corresponding imide

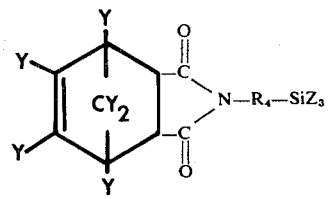

as well as to form various other complex reaction products.

Examples of such compounds include the following:

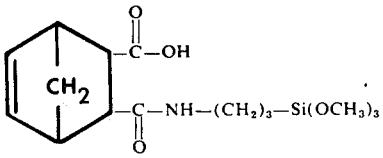

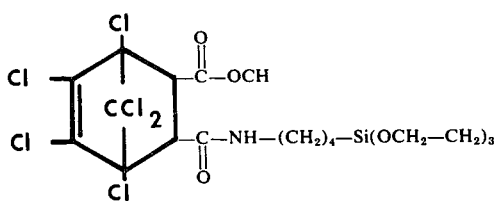

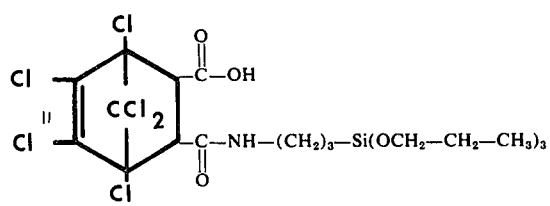

As pointed out above, the compounds in which Z is a beta-haloalkoxy group

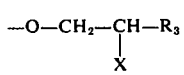

are particularly advantageous since the beta-haloalkoxy group stabilizes the silane to render it more resistant to hydrolysis.

Another concept of the invention resides in silanes of the formula

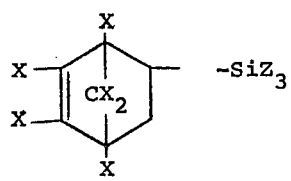

wherein X is halogen as described above, and Z is as described above. These compounds are particularly useful as flame retardants, as more fully described hereinafter due to the presence of the halogen atoms.

These compounds are prepared by condensing an alkenyl silane

$CH_2 = CH — SiZ_3$ with hexachlorocyclopentadiene (or hexabromocyclopentadiene) by way of the well-known Diels-Alder reaction. The reaction is carried out by contacting the reactants, preferably in the presence of an inert organic solvent, at a reaction temperature of 10° to 130°C.

Compounds illustrative of this concept include the following:

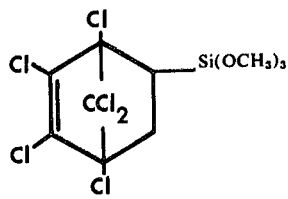

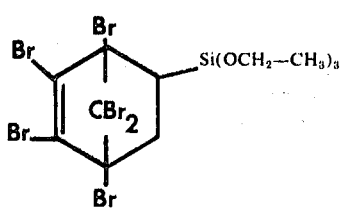

Compounds of this type which are of particular value in the treatment of glass fibers are those compounds in which Z is a beta-haloalkoxy group

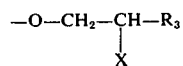

since the halogen atom in the beta-position renders the compounds more resistant to hydrolysis.

Such compounds include the following:

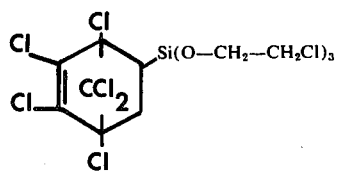

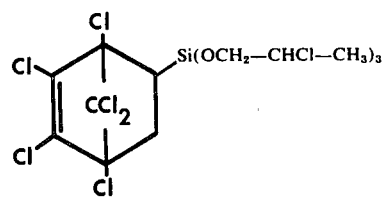

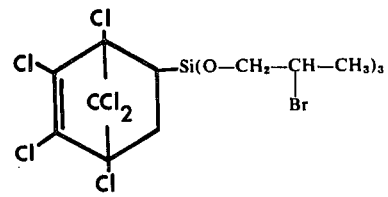

Also suitable for use in the treatment of glass fibers are the compounds

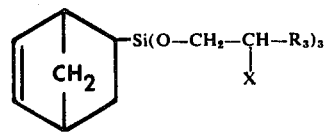

These compounds are prepared in the same manner except that the diene is cyclopentadiene and contain the beta-haloalkoxy group for improved stability against hydrolysis.

Representative compounds include:

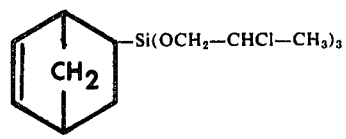

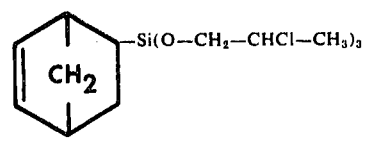

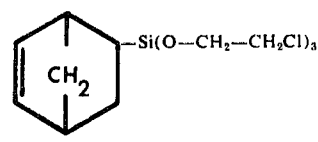

The silanes of the present invention are useful as coupling agents in establishing a secure bonding relationship between glass fibers and elastomeric materials or thermosetting and/or thermoplastic resins. They can also be blended along with fillers in various plastics to bond the filler to the plastic. The silanes of the invention which contain hexachloronorbornenyl groups are particularly useful for the latter application since they have excellent flame retardant properties.

Having described the basic concepts of the invention, reference is now made to the following examples which are provided by way of illustration, and not by way of limitation, of the practice of the invention in the preparation and use of the coupling agents of the invention.

EXAMPLE 1

This example illustrates the preparation of an adduct of gamma-mercaptopropyltriethoxy silane with succinic anhydride.

Succinic anhydride is dissolved in gamma-mercaptopropyltriethoxy silane, and the solution is heated for 3 hours at 105°C and for 1 hour at 150°C to form the adduct;

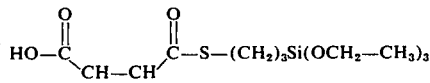

and is a brown syrupy liquid.

EXAMPLE 2

This example illustrates the preparation of an adduct of succinic anhydride and gamma-mercaptopropyltri(-beta-chloropropoxy)silane.

Using the procedure described in U.S. Pat. No. 2,823,218, allyl chloride is reacted with trichlorosilane in the presence of chloroplatinic acid to produce gamma-chloropropyltrichloro-silane. The latter compound is reacted with propylene oxide as described in copending application Ser. No. 278,904 to form gamma-chloropropyltri(beta-chloropropoxy)silane which is in turn converted to the corresponding gamma-mercaptopropyl-tri(beta-chloropropoxy)silane with $H_2S$ in a conventional manner.

Using the procedure described in Example 1, the gamma-mercaptopropyltri(beta-chloropropoxy)silane is reacted with succinic anhydride to form the following compound:

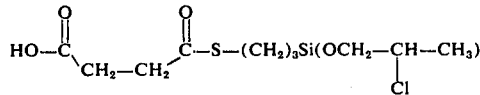

EXAMPLE 3

Using the procedure described in Example 1, phthalic anhydride is reacted with Δ-mercaptobutyl-trimethoxysilane to form the compound

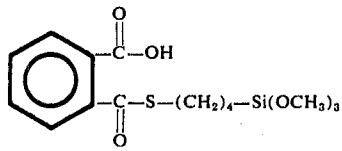

EXAMPLE 4

Using the procedure described in Example 2, gamma-mercaptopropyltri(beta-chloroethoxy)silane is prepared using ethylene oxide instead of propylene oxide. This silane is then reacted with chlorendic anhydride (1,4,5,6,7,7-hexachloro-5-norbornene-2,3-dicarboxylic acid) in a mole ratio of 1:1 using the procedure of Example 1.

The following product can be isolated.

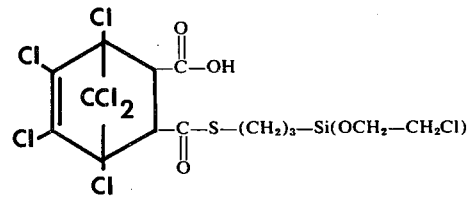

EXAMPLE 5

This example illustrates the preparation of an adduct of gamma-glycidoxypropyltriethoxy silane with maleic anhydride.

Using the procedure described in Example 1, gamma-glycidoxypropyltriethoxysilane is reacted with maleic anhydride in a mole ratio of 1:1. When contacted with a molar equivalent of water, the following can be isolated.

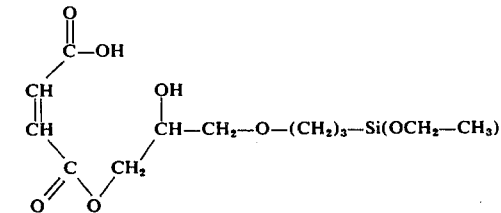

EXAMPLE 6

Using the procedure described in Example 2, gamma-chloropropyltris-(beta-chloropropoxy)silane is prepared and then reacted with sodium glycidolate in accordance with the teachings of copending application Ser. No. 278,904 to produce gamma-glycidoxypropyl-tris-(beta-chloropropoxy)silane.

This silane is then reacted with maleic anhydride and water to form the following compound:

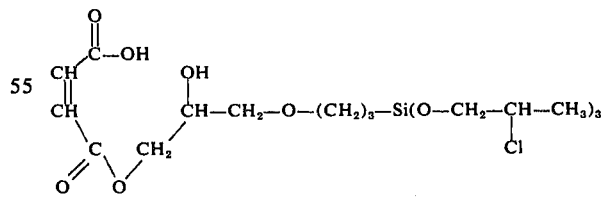

EXAMPLE 7

Δ-Glycidoxybutyltris-(betachloroethoxy)silane is prepared in accordance with the procedure described in the foregoing copending application, and is then reacted with the chlorendic anhydride.

The product of the reaction, after contact with water, has the formula

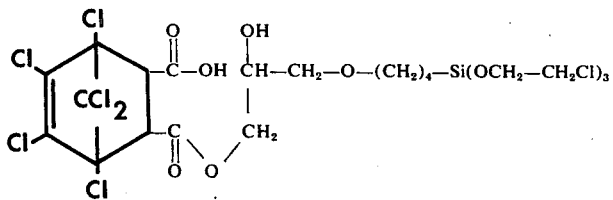

EXAMPLE 8

Gamma-glycidoxypropyltrimethoxy silane is reacted with phthalic anhydride in accordance with the procedure described in Example 7. The product of the reaction is a compound having the formula:

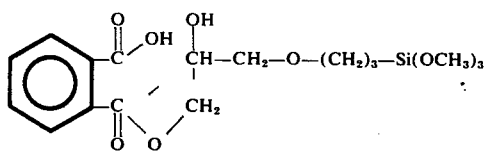

EXAMPLE 9

This example illustrates the preparation of the adduct from chlorendic acid and gamma-aminopropyltriethoxy silane.

Equimolar amounts of chlorendic anhydride and the amino silane are reacted in the presence of ethanol as a solvent. The amino silane is dissolved in ethanol and the solution cooled to 0°C; the anhydride is added over the course of an hour so that the temperature does not exceed 17°C. The product of the reaction having the formula:

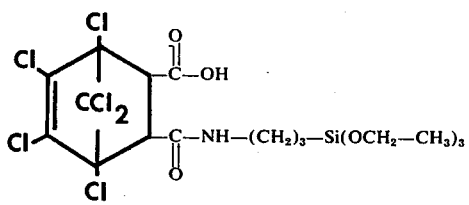

can be isolated.

EXAMPLE 10

The procedure of Example 9 is repeated, except that the anhydride employed is 5-norbornene-2,3-dicarboxylic acid. The product with the formula

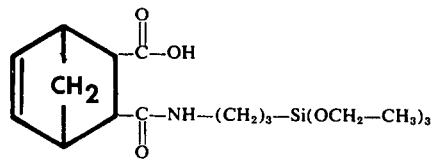

can be isolated.

EXAMPLE 11

The monoethyl ester of phthalic anhydride is reacted with gamma-glycidoxypropyltrimethoxysilane. The product with the formula

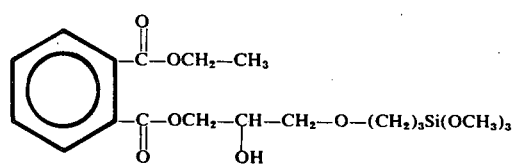

can be isolated.

EXAMPLE 12

The monomethyl ester of maleic acid is reacted with delta-glycidoxybutyltris-(beta-chloropropoxy)silane. The product

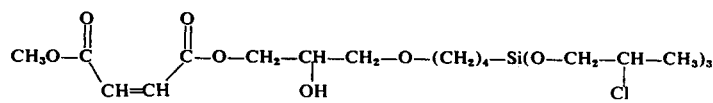

can be isolated.

EXAMPLE 13

5-Norbornene-2,3-dicarboxylic acid is reacted with gamma-aminopropyltriethoxysilane to form the following compound:

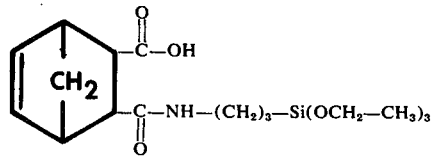

EXAMPLE 14

This example illustrates the preparation of a Diels-Alder adduct of vinyltris-(beta-chloroethoxy) silane (prepared by reaction of vinyl trichlorosilane with ethylene oxide) and cyclopentadiene.

One mole of the vinyl silane is dissolved in cyclopentadiene. The reaction mixture is maintained at 120°C for 5 hours. The reaction mixture is purified and the adduct is separated therefrom. It has the formula

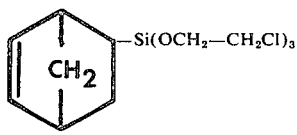

EXAMPLE 15

Using the procedure described in Example 14, vinyltriethoxy silane is reacted with hexachlorocyclopentadiene. The product is

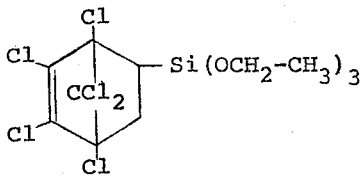

As will be appreciated by those skilled in the art, the silanes of the present invention can be formulated into a variety of compositions for use in the treatment of glass fibers in the manufacture of glass fiber reinforced resin products including glass fiber reinforced plastics, laminates and coated fabrics, and in the manufacture of glass fiber reinforced elastomeric products such as drive belts, rubber tires and the like.

The term "glass fibers", as used herein, is intended to refer to and include (1) continuous fibers formed by rapid attenuation of hundreds of streams of molten glass and to strands formed when such continuous glass fiber filaments are gathered together as they are being formed; and to yarns and cords formed by plying and-/or twisting a number of strands together, and to woven and non-woven fabrics which are formed of such glass fiber strands, yarns or cords, and (2) discontinuous fibers formed by high pressure steam, air or other suitable attenuating force directed onto multiple streams of molten glass issuing from a glass melting bushing or from an orifice containing spinner, and to yarns that are formed when such discontinuous fibers are gathered together to form a sliver which is drafted into a yarn; and to woven and non-woven fabrics formed of such yarns of distontinuous fibers, and (3) combinations of such continuous and discontinuous fibers in strands, yarns, cords and fabrics formed thereof.

The silane coupling agents of the present invention can simply be formulated into an aqueous medium for application to the glass fibers to form a thin film from the silane. However, it is frequently preferred to formulate the silanes of the invention in combination with a film-forming material. A wide variety of film-forming materials can be used for this purpose and includes polyester resins, polyamide resin, polyolefin resins (e.g., polyethylene, polypropylene, etc.), polyepoxide resins, vinyl resins (e.g., polyvinyl chloride, polyvinyl acetate, polyvinyl alcohol, polyvinyl pyrrolidone, etc.), waxes, partially dextrinized starch as well as numerous others. Such materials are themselves well known to those skilled in the art and are described in U.S. Pat. Nos. 2,931,739, 2,958,114, 3,040,413, 3,252,278, 3,424,608 and others. Combinations of two or more of the above film-forming materials can also be used.

The size compositions can also be formulated to include any of a variety of wetting agents, glass fiber lubricants, etc., which are likewise known to the art. The size compositions can be formulated in aqueous media or in inert organic solvents, depending on the intended use of the treated glass fibers and the nature of the film-forming material or materials employed.

Examples of such size compositions which can be employed in the treatment of glass fibers for use in the manufacture of glass fiber reinforced resins and elastomeric products include the following.

EXAMPLE 16
Size Composition

|  | Parts by weight |
|---|---|
| Silane of Example 1 | 1.0 |
| Polypropylene emulsion | 5.5 |
| Water | 93.5 |

EXAMPLE 17
Size Composition

|  | Parts by weight |
|---|---|
| Silane of Example 4 | 1.1 |
| Wetting agent (Nopcogen 16L) | 0.1 |
| Water | 98.8 |

EXAMPLE 18
Size Composition

|  | Parts by weight |
|---|---|
| Silane of Example 6 | 1.5 |
| Epoxy resin (DER 330) | 7.0 |
| Diacetone alcohol | 91.5 |

EXAMPLE 19
Size Composition

|  | Parts by weight |
|---|---|
| Silane of Example 10 | 1.5 |
| Saturated polyester resin | 3.0 |
| Polyvinyl alcohol | 1.0 |
| Wetting agent | 0.5 |
| Water | 94.0 |

EXAMPLE 20
Size Composition

|  | Parts by weight |
|---|---|
| Partially dextrinized starch | 8.0 |
| Hydrogenated vegetable oil | 1.5 |
| Wetting agent | 0.5 |
| Silane of Example 17 | 1.8 |
| Water | 88.2 |

In formulating size compositions with the coupling agents of the present invention, the coupling agent is generally employed in an amount constituting from 0.1 to 10% by weight of the composition, and the film-forming binder in an amount from 1 to 25% by weight of the composition. These amounts are not critical to the practice of the invention and can be varied as desired. The compositions of Examples 18 to 22 can be applied to glass fibers as they are formed or afterwards, in accordance with conventional procedures.

Glass fibers coated with the silanes of the present invention can be incorporated in the form of fibers, yarns, rovings, fabrics and the like with resin materials, including epoxy resins, polyester resin, polyamide resins as well as numerous other thermosetting plastics in amounts such that the treated glass fibers constitute from 1 to 20% by weight of the plastic laminate or coated fabric formed. The coating on the individual glass fibers, comprising as the essential component the silanes of the present invention, serves to provide a secure bonding relationship between the glass fiber surfaces and the resin.

Glass fibers sized with a composition embodying the silanes of the present invention can also be used in the manufacture of glass fiber reinforced elastomeric products. In the preferred practice of this concept of the invention, the glass fibers which have been sized with one of the compositions of Examples 16 to 20 are formed into strands, yarns, cords formed of strands which are plied and twisted together, or threads, hereinafter referred to as bundles, are subjected to impregnation with an aqueous composition formulated to include a resorcinal-aldehyde resin component and an elstomer component.

A wide variety of such impregnating compositions are well known to those skilled in the art and are described in U.S. Pat. Nos. 3,402,064, 3,424,608, 3,567,671, 3,591,357 and numerous others. This concept may be illustrated by way of the following examples.

EXAMPLE 21

Using the procedure described in U.S. Pat. No. 3,567,671, an impregnating composition is formulated as follows:

| Impregnating Composition | Parts by weight (solids basis) |
|---|---|
| Resorcinol-formaldehyde resin (Penacolyte R 2170) | 5.0 |
| Vinyl pyridine-butadiene-styrene terpolymer (Gentac PS) | 30.0 |
| Vinyl chloride-vinylidene chloride copolymer (Dow Latex 874) | 20.0 |
| Microcrystalline paraffin wax | 6.0 |

Water constitutes the balance of the composition and is present in an amount sufficient to adjust the solids content of the composition to within the range of 20 to 55% solids by weight. The impregnation can be carried out in accordance with the procedure described in U.S. pat. No. 3,424,608 whereby the solids of the impregnating composition serve to coat the fibers which have been previously sized with one of the compositions of Examples 18 to 22 and serve to separate the sized fibers each from the other to cushion the fibers and protect the sized fibers from destruction by mutual abrasion.

EXAMPLE 22

Glass fibers sized with the composition of Example 19 are impregnated with the following impregnating composition of the type illustrated in Example 22, except that the vinyl chloride-vinylidene chloride copolymer component is replaced by a dicarboxylated butadiene-styrene resin:

| Impregnating Composition | Parts by weight (solids) |
|---|---|
| Resorcinol-formaldehyde resin | 5.0 |
| Vinyl pyridine-butadiene-styrene terpolymer | 30.0 |
| Dicarboxylated butadiene-styrene resin (Pliolite 4121 — Goodyear) | 20.0 |
| Microcrystalline paraffin wax | 6.0 |
| Water to solids content of 35% | |

Application of this impregnating composition can be made in an amount sufficient to deposit in the glass fiber bundle solids constituting from 15 to 40% by weight of the glass fiber system.

In accordance with a further concept of this invention, the novel silanes of this invention containing a beta-haloalkoxy group can be formulated into an impregnating composition containing a resorcinol-aldehyde resin component and an elastomer component. As indicated above, the novel silanes of the present invention are particularly suitable for use in such impregnating compositions because the beta-haloalkoxy group stabilizes the silane in the alkaline impregnating composition upon hydrolysis which in turn prevents undesirable coagulation of the latex component of the impregnating composition.

This concept of the invention may be illustrated by way of the following examples.

EXAMPLE 23

Using the procedure described in U.S. pat. No. 3,567,671, an impregnating composition is formulated in accordance with the following

| Impregnating Composition | Parts by weight |
|---|---|
| Resorcinol-aldehyde resin | 2–10 |
| Vinyl pyridine-butadiene-styrene terpolymer | 20–60 |
| Vinyl chloride-vinylidene chloride copolymer | 15–40 |
| Microcrystalline paraffin wax | 5–30 |
| Silane of Example 13 | 0.1–10 |

It is found that the above composition, which is diluted with water to adjust the solids content to within the range of 20 to 55% by weight solids, is stable over long periods of time. No coagulation of the latex components is observed.

| EXAMPLE 24 Impregnating Composition | Parts by weight |
|---|---|
| Resorcinol-formaldehyde resin | 2–10 |
| Vinyl pyridine-butadiene-styrene terpolymer | 20–60 |
| Dicarboxylated butadiene-styrene resin (Pliolite 4121) | 15–40 |
| Microcrystalline wax | 5–30 |
| Silane of Example 12 | 0.1–10 |

| EXAMPLE 25 Impregnating Composition | Parts by weight |
|---|---|
| Resorcinol-formaldehyde resin | 2–10 |
| Vinyl pyridine-butadiene-styrene terpolymer | 20–60 |
| Silane of Example 15 | 0.1–10 |

| EXAMPLE 26 Impregnating Composition | Parts by weight |
|---|---|
| Resorcinol-formaldehyde resin | 2–10 |
| Natural rubber latex or SBR latex | 20–60 |
| Silane of Example 2 | 0.1–10 |

| EXAMPLE 27 Impregnating Composition | Parts by weight |
|---|---|
| Resorcinol-formaldehyde resin | 2–10 |
| Vinyl pyridine-butadiene-styrene terpolymer | 20–60 |
| Silane of Example 6 | 0.1–10 |

Each of the compositions of Examples 23 to 27, diluted with water to adjust the solids content, can be employed in the treatment of bundles of glass fibers which may or may not contain a size coating as described above.

As will be appreciated by those skilled in the art, the compositions of Examples 24 to 27 can be applied as a size, preferably with greater dilution to adjust the solids content to within the range of 15 to 40% solids by weight, to individual glass fibers to form a thin film coating on the surfaces thereof. The resorcinol-aldehyde resin component and the elastomer component serve as film-formers on the glass fiber surfaces to provide a coating which affords maximum protection to the fibers from destruction through mutual abrasion for use in the manufacture of glass fiber reinforced elastomeric products.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles, styrene and vinyl pyridine; and EPDM rubbers as represented by butadiene polymers and copolymers with monoolefins such as butadiene-styrene vinyl pyridine terpolymers, chloroprene, isoprene, neoprene, isobutyl rubber and the like elastomeric polymers and copolymers in their curved or uncured stages, and vulcanized or unvulcanized stages. Included also are the EPDM rubbers, such as formed by the interpolymerization of ethylene, an alpha-monoolefin having from 3–20 carbon atoms, such as propylene, and polyene, such as dicyclopentadiene, 1,4-hexadiene and preferably an alkylene or alkylidene norbornene, such as 5-alkylidene-2-norbornene and the like in which the alkylidene group numbers from 2–13 carbon atoms, and polysulfone rubbers.

In facilitating the combination of glass fibers treated in accordance with the present invention with elastomeric materials, the individual glass fibers containing a coating on the surfaces thereof from Examples 16 to 20 or bundles of glass fibers impregnated with one of the compositions of Examples 23 to 27 are mixed with elastomeric material or otherwise laid down in the desired arrangement for combination with the elastomeric material, as in the manufacture of glass fiber-reinforced belts or in the manufacture of rubber tires reinforced with cords of glass fibers, The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric material in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

We claim:

1. A compound selected from the group consisting of (1) a compound having the formula

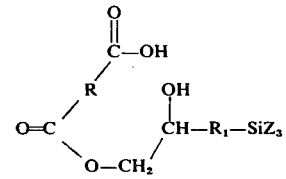

and (2) a compound of the formula

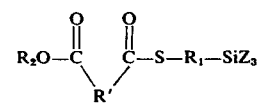

wherein R and R' are each a divalent organic group containing 2 to 10 carbon atoms; $R_1$ is alkylene or alkyleneoxyalkylene, $R_2$ is hydrogen or alkyl and Z is selected from the group consisting of a readily hydrolyzable group and a beta-haloalkoxy group.

2. A compound as defined in claim 1 wherein R is selected from the group consisting of alkylene, alkenylene, arylene and a norbornenylene group.

3. A compound as defined in claim 2 wherein R is a norbornenylene group having the formula

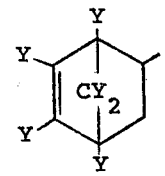

wherein Y is selected from the group consisting of hydrogen, halogen, cyano and nitro.

4. A compound as defined in claim 1 wherein Z is an alkoxy group.

5. A compound as defined in claim 1 wherein the compound has the formula

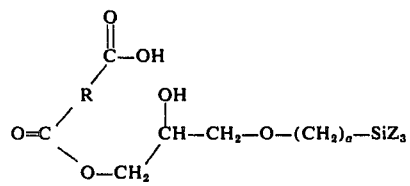

wherein $a$ is an integer from 2 to 6.

6. A compound as defined in claim 5 wherein Z is alkoxy.

7. A compound as defined in claim 6 wherein Z is a group of the formula

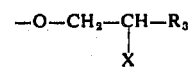

wherein X is halogen and $R_3$ is hydrogen or alkyl.

8. A compound as defined in claim 1 wherein the compound has the formula

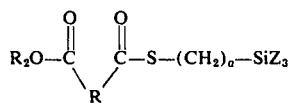

wherein $a$ is an integer from 2 to 6.

9. A compound as defined in claim 8 wherein Z is a group of the formula

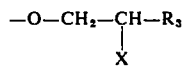

wherein X is halogen and $R_3$ is hydrogen or alkyl.

10. A compound as defined in claim 1 wherein the compound has the formula

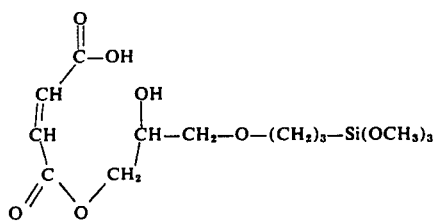

11. A compound as defined in claim 1 wherein the compound has the formula

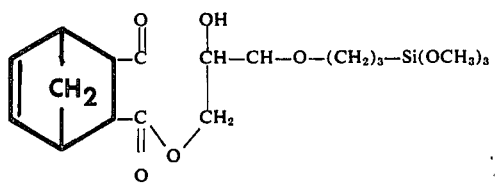

12. A compound as defined in claim 1 wherein the compound has the formula

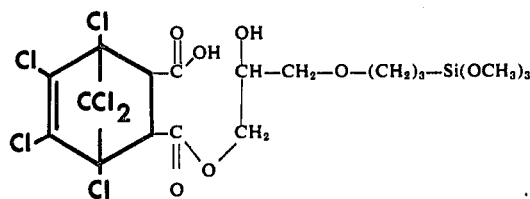

13. A compound as defined in claim 1 wherein the compound has the formula

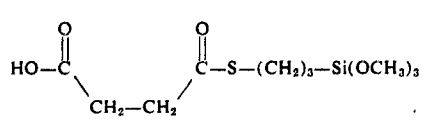

14. A compound as defined in claim 1 wherein the compound has the formula

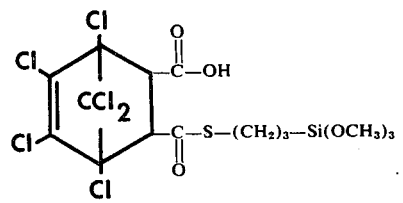

15. A compound selected from the group consisting of (1) a compound of the formula

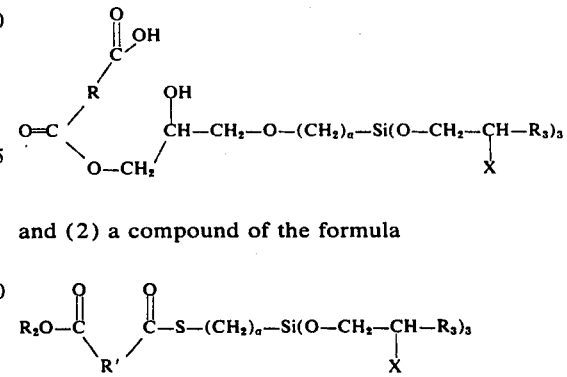

and (2) a compound of the formula wherein R and R' are each selected from the group consisting of alkylene, alkenylene, arylene and norbornenylene; $R_2$ is hydrogen or alkyl, $R_3$ is hydrogen or alkyl and $a$ is an integer from 1 to 6.

16. A compound as defined in claim 15 wherein R is a norbornenylene group having the formula

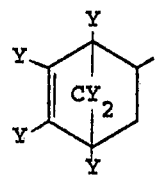

wherein Y is selected from the group consisting of hydrogen, halogen, cyano and nitro.

17. A compound as defined in claim 15 wherein the compound has the formula

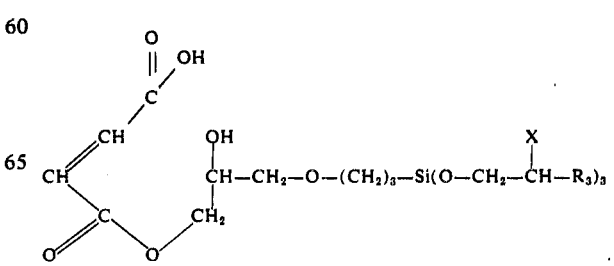

18. A compound as defined in claim 15 wherein the compound has the formula

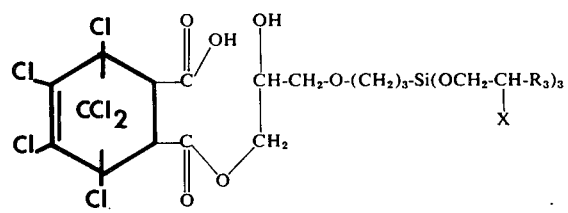

19. A compound as defined in claim 15 wherein the compound has the formula

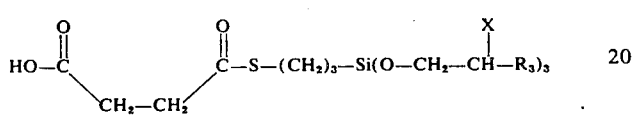

20. A compound as defined in claim 15 wherein the compound has the formula

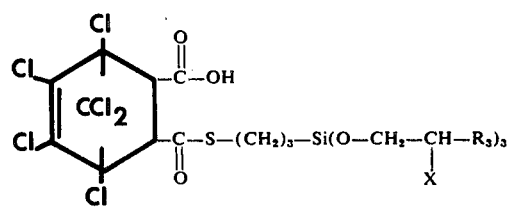

21. A compound having the formula

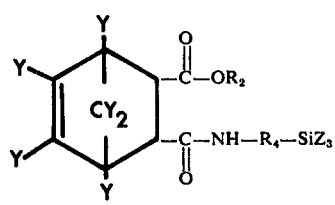

wherein Y is selected from the group consisting of hydrogen, halogen, cyano and nitro, $R_2$ is hydrogen or alkyl, $R_4$ is $C_3$ to $C_6$ alkylene and Z is selected from the group consisting of a readily hydrolyzable group and a beta-haloalkoxy group.

22. A compound as defined in claim 21 wherein Z is a beta-haloalkoxy group of the formula

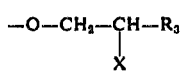

wherein X is halogen and $R_3$ is hydrogen or alkyl.

23. A compound as defined in claim 21 wherein the compound has the formula

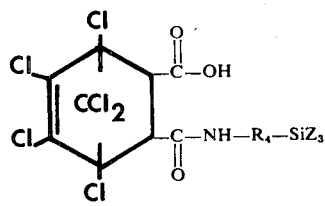

24. A compound having the formula

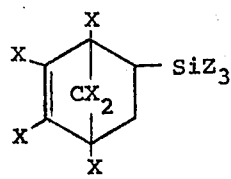

wherein X is halogen, and Z is selected from the group consisting of a readily hydrolyzable group and a beta-haloalkoxy group.

25. A compound as defined in claim 24 wherein X is chlorine.

26. A compound as defined in claim 24 wherein Z is a beta-haloalkoxy group.

27. A compound having the formula

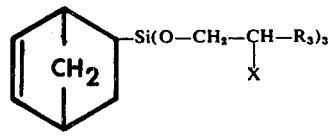

wherein X is halogen and $R_3$ is hydrogen or alkyl.

28. Glass fibers having a thin coating thereon to improve the bonding relationship between glass fibers and elastomeric or plastic resins, said coating comprising a compound selected from the group consisting of (1) a compound having the formula

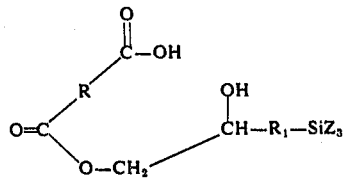

wherein R and R' are each a divalent organic group containing 2 to 10 carbon atoms, $R_1$ is alkylene or alkyloxyalkylene, and Z is selected from the group consisting of a readily hydrolyzable group and a beta-chloroalkoxy group, (2) a compound of the formula

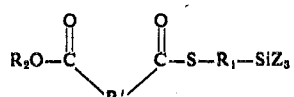

(3) a compound of the formula

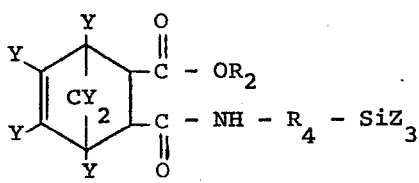

wherein Y is selected from the group consisting of hydrogen, halogen, cyano and nitro, $R_2$ is hydrogen or alkyl and $R_4$ is alkylene, (4) a compound of the formula

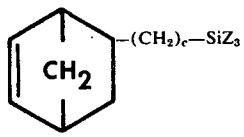

wherein $c$ is 0 or an integer from 1 to 3, (5) the halogenated derivatives of (4) and the hydrolysis products of (1) through (5).

29. Glass fibers as defined in claim 28 wherein the coating also includes a film forming material.

30. Glass fibers as defined in claim 28 wherein the coating also includes a blend of a resorcinol-aldehyde resin and an elastomer.

31. Glass fibers as defined in claim 28 wherein the glass fibers are in the form of a bundle and the coating constitutes an impregnant in the bundle.

32. Glass fibers as defined in claim 28 wherein the glass fibers are in the form of a bundle and the coating constitutes a size coating on the individual glass fibers forming the bundle, said bundle including an impregnant therein comprising an elastomer compatible material.

33. Glass fibers as defined in claim 28 wherein the fibers forming the bundle are in the form of strands which have been plied and twisted together.

34. In a glass fiber reinforced product comprising a material selected from the group consisting of an elastomer and a thermosetting resin constituting a continuous phase in which glass fibers are distributed, the improvement comprising as the glass fiber reinforcement glass fibers as defined in claim 28.

* * * * *